United States Patent [19]

Mahajan

[11] Patent Number: 4,864,612
[45] Date of Patent: Sep. 5, 1989

[54] METHOD OF AVOIDING ACCIDENTAL ACTUATION OF MAINTENANCE EQUIPMENT IN A COMMUNICATIONS NETWORK

[75] Inventor: Om P. Mahajan, Ocean, N.J.

[73] Assignees: American Telephone and Telegraph Company, New York, N.Y.; AT&T Bell Laboratories, Murray Hill, N.J.

[21] Appl. No.: 112,846

[22] Filed: Oct. 23, 1987

[51] Int. Cl.$^4$ .......................... H04K 1/00; H04K 1/02
[52] U.S. Cl. ............................................ 380/2; 380/9
[58] Field of Search .................................. 380/1, 2, 9

[56] References Cited

U.S. PATENT DOCUMENTS

| | | |
|---|---|---|
| 3,868,631 | 2/1975 | Morgan et al. |
| 4,608,701 | 4/1986 | Burgers et al. ........................ 375/1 |
| 4,627,074 | 12/1986 | Marwitz et al. |
| 4,639,548 | 1/1987 | Oshima et al. |

Primary Examiner—Stephen C. Buczinski
Attorney, Agent, or Firm—David R. Padnes

[57] ABSTRACT

A technique for avoiding accidental actuation of communications system devices which respond to a predetermined pattern of signals. In accordance with the present invention, data to be transmitted through the communications system is scrambled so as to reduce the likelihood of the customer data mimicking the predetermined pattern of signals. At the receiving end, the scrambled customer data is descrambled to its original condition.

4 Claims, 2 Drawing Sheets

METHOD OF AVOIDING ACCIDENTAL ACTUATION OF MAINTENANCE EQUIPMENT IN A COMMUNICATIONS NETWORK

TECHNICAL FIELD

The present invention relates to maintenance equipment which automatically responds to predetermined signals transmitted in a communications network and, more particularly, to a method of avoiding inadvertent actuation of the operation of this equipment.

BACKGROUND OF THE INVENTION

Communications networks often incorporate maintenance equipment which enable the sectionalization and isolation of faults. The term "fault" is a generic term which denotes an improper operation of a communications network. Sectionalization of a fault is the determination that a fault is originating within a particular section or link in a series of links in the communications network. Such a link may contain a number of different circuits. Isolation of a fault is the determination that a particular piece of communications equipment in the particular link is operating improperly.

To provide fault sectionalization or isolation, predetermined test signals are typically inserted into the circuit under test via a test system. In digital communications systems, the prescribed test and response signals are generically known as control bits and are transmitted in prescribed time slots. In any event, during the transmission of test and response signals, the communications system is not available for the transmission of data by a customer.

In one well-known fault detection technique, test signals are transmitted from a test location to maintenance equipment situated at other locations in the circuit under test. Upon receipt of these test signals, the maintenance equipment transmits predetermined response signals back to the test location. The receipt of such response signals at the test location then provides an indication that the section of the communications network, including one or more links, is functioning properly. Conversely, improper operation is indicated by the absence of these response signals at the test location. In other applications, the response of the maintenance equipment to the test signals is to provide a "loop-back" whereby the transmit and receive signal paths are connected together. As a result, the test signal transmitted is coupled to the test location. In still other applications, the maintenance equipment could provide an open circuit in the communications network. With the burgeoning growth of communications systems both in number and complexity, the above described test and maintenance procedures significantly reduce the time and expense associated with network maintenance and fault sectionalization and/or isolation.

While the above-described maintenance and test procedures provide a significant reduction in both the time and expense associated with network maintenance and fault correction, the reservation of particular time periods for the transmission of test and response signals, lengthens the transmission time in analog communications systems or reduces the bandwidth available for the user of a digital communications system. These effects are troublesome in particular applications where faster communication or greater bandwidths are desired. While these effects could be eliminated by removing the test and maintenance equipment, such action is undesirable as the time and expense required to restore network outages would be considerably increased. Similarly, the transmission of unrestricted system user data in the time periods reserved for test and maintenance can result inadvertent actuation of the remote maintenance equipment when such data mimics the prescribed test signals. Such actuation would subsequently disrupt the transmission of user data. Accordingly, a technique for precluding the inadvertent actuation of maintenance and test equipment in a communications system would be high desirable.

SUMMARY OF THE INVENTION

The present invention relates to a methodology for preventing the inadvertent actuation of maintenance equipment in a communications system without increasing the time required for transmission of customer data or decreasing the available bandwidth. Pursuant to the present invention, data scramblers and descramblers are situated at the transmitting and receiving ends of a communications network. This scrambling equipment randomizes any signals entering the network so as to virtually eliminate the likelihood of customer data mimicking predetermined and repetitive maintenance and/or test signals which actuate maintenance equipment in the network. At the receiver, the scrambled data is descrambled and returned to the original condition provided by the customer. Advantageously, this technique can be readily implemented in either analog or digital communications systems and is transparent to communication system users.

BACKGROUND OF THE INVENTION

DETAILED DESCRIPTION

Figure 1:
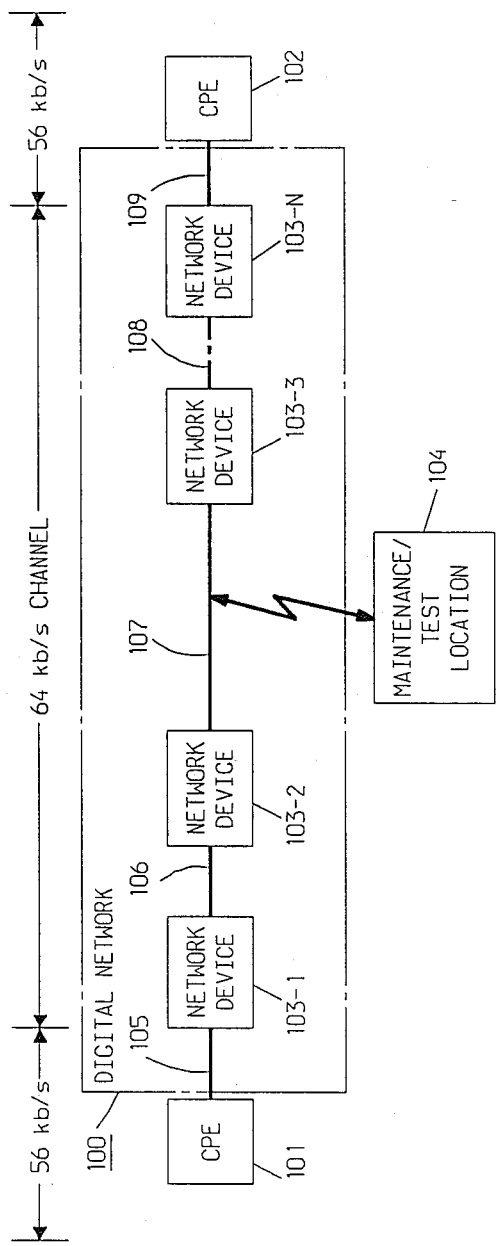
FIG. 1 is a block-schematic diagram of prior art communications network.

FIG. 1 shows an illustrative digital communications system 100 which provides a signal transmission path between customer premises equipment (CPE) 101 situated at first location to CPE 102 situated at a second location. System 100, is assumed to be a part of a communications network which provides communications servies for many users. As illustrated, system 100 includes one or more well-known network devices (ND) 103-1 through 103-N which are designed to provide a "loopback" in response to a repetitive pattern of predetermined maintenance/test signals from a maintenance test location 104. These network devices may provide other nonmaintenance/test related functions, such as signal regeneration or amplification. Indeed, the maintenance/test capability may constitute a small part of the total functionality provided by a network device. Signal paths 106-108 of system 100 which interconnect ND 103-1 through 103-N are each designed to provide communications services through a plurality of digital channels. Each of these digital channels operate at the rate of 64 kilobits/seconds (kb/s), with 8 kb/s being reserved for in-band control signals, such as maintenance/test signals. Consequently, the maximimum data rate which can be transmitted to or from CPE 101 and CPE 102 via signal paths 105 and 109 is limited to 56 kb/s.

In certain digital communications applications, such as the wide variety of well-known "special services", such as private line data services, a communications channel is reserved for a particular customer, use. Therefore, such channels are not available for routine maintenance and testing without the notification and consent of the customer and the reservation of 8 kb/s for in-band signaling unnecessarily limits the customer's data rate. While such special services could be designed without network devices which automatically provide loopback in response to a repetitive pattern of predetermined digital signals, the availability of such devices in a special service system significantly lessens the time required to restore service when the customer suspects the system is operating improperly and control of the system is turned over to the communication system provider for testing. In addition, such special service systems could be reserved only for particular times and at other times the system is available for public use. At such other times, the 8 kb/s in-band signaling is necessary for the overall automated maintenance capability of the communications network of which system 100 is a part.

Figure 2:
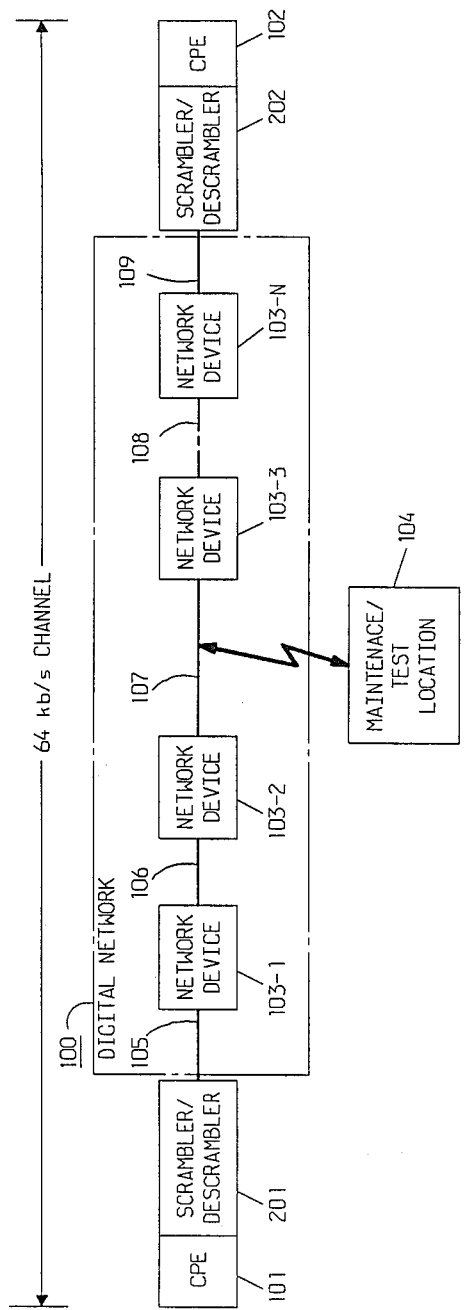
FIG. 2 is a block schematic diagram of the communications network of FIG. 1 incorporating the present invention.

FIG. 2 shows a technique for increasing the maximum permissible customer data rate through system 100 from 56 kb/s to 64 kb/s by reallocating the 8 kb/s in-band signaling to customer-generated data by scrambling and descrambling. As shown, conventional scrambler/descrambler 201 is included between CPE 101 and signal path 105 while conventional scrambler/descrambler 202 is included between CPE 102 and signal path 109. While the disclosed embodiment is described in regard to a digital system application, the term scrambler/descrambler shall be understood to encompass analog signal randomizers, e.g., spread spectrum devices. Each scrambler/descrambler scrambles the customer data transmitted from its associated customer premises equipment and couples the same to system 100 and descrambles the customer data received by the associated customer premises equipment. As a result, there is virtually no likelihood of any customer data mimicking the predetermined periodic maintenance/test signals which activate the network devices.

The information represented by the customer data is virtually limitless and can include voice, video, facsimile and the like. The foregoing technique provides many benefits, such as transparency to the customer, use of the network devices for maintenance and test when control of a special service is given to the system provider. In addition, this approach permits special service communication circuits which are established only for certain time periods and, at other times, are routinely maintained and tested using prescribed maintenance/test signals.

While any scrambler/descrambler is suitable for use with the present invention, the preferred scrambler/descrambler is one which is self-synchronizing and utilizes a counter. Such a scrambler/descrambler of k-stages with tap polynomial of degree m, where m and k are integers and m<k, will transform an input signal of period s into an output signal having a period which is the least common multiple (LCM) of s and $2^m - 1$ if:

(1) s is a submultiple of k, (2) the tap polynomial, designated as h(x), is primitive, and (3) the counter threshold, t, is >m.

Further details on this type of scrambler can be found in a publication entitled, "Some Simple Self-Synchronizing Digital Data Scramblers," by J. E. Savage, *Bell System Technical Journal*, February 1967, pp. 449–487.

A specific scrambler of this type which was derived from the above algorithm and exhibited preferable characteristics was one where k=8, m=5, t=5 and the tap polynomial is $1 + x^3 + x^5$.

It should be understood that while the present invention has been disclosed with respect to a particular embodiment, other arrangements should be apparent to those skilled in the art without departing from the spirit and scope of the present invention. First, for example the present invention is not limited to any communication system topology. Second, the disclosed use of scramblers/descramblers to preclude operation of automated maintenance/test equipment can be used for analog as well as digital communications. In analog systems, the scramblers/descramblers would be replaced by equipment which randomizes the customer's analog signals. Finally, while the present invention has been disclosed with respect to poviding a 64 kb/s data rate, the present invention is applicable to communications systems operating at other data rates with in-band signaling.

What is claimed is:

1. A method for increasing the information-carrying capacity of a communications network in which customer-generated data is transmitted in a first time period and test and maintenance signals which automatically actuate equipment in the network is transmitted in a second time period, the equipment actuation being incompatible with the transmission of customer-generated data, said method comprising the steps of scrambling the customer-generated data so as to reduce the likelihood of said data mimicking said test and maintenance signals, and transmitting said scrambled customer-generated data in said network during said first and second time periods, whereby said method reallocates the use of said second time period from maintenance and test signals to customer-generated data.

2. The method of claim 1 wherein said customer data is a digital signal.

3. The method of claim 2 wherein said customer data has a data rate of 64 kilobits/second.

4. The method of claim 1 wherein said customer data is an analog signal.

* * * * *